(12) United States Patent
Kim et al.

(10) Patent No.: US 8,777,813 B2
(45) Date of Patent: Jul. 15, 2014

(54) METHOD OF CONTROLLING DOUBLE CLUTCH TRANSMISSION OF VEHICLE

(75) Inventors: Joung Chul Kim, Suwon-si (KR); Jong Sool Park, Hwaseong-si (KR); Byeong Wook Jeon, Seoul (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 268 days.

(21) Appl. No.: 13/303,903

(22) Filed: Nov. 23, 2011

(65) Prior Publication Data

US 2012/0312110 A1 Dec. 13, 2012

(30) Foreign Application Priority Data

Jun. 9, 2011 (KR) .................. 10-2011-0055635

(51) Int. Cl.
*B60W 10/02* (2006.01)

(52) U.S. Cl.
USPC .......................................... 477/174; 477/180

(58) Field of Classification Search
USPC ........ 477/79, 80, 174, 175, 176, 180; 74/330, 74/331, 335, 340
See application file for complete search history.

(56) References Cited

U.S. PATENT DOCUMENTS

| 5,172,602 | A | 12/1992 | Jürgens et al. |
| 5,863,276 | A | 1/1999 | Lee |
| 5,915,512 | A * | 6/1999 | Adamis et al. ............... 192/3.61 |
| 6,009,768 | A | 1/2000 | Hoshiya et al. |
| 6,679,134 | B2 * | 1/2004 | Shigyo ........................ 74/336 R |
| 6,826,974 | B2 | 12/2004 | Kobayashi |
| 6,832,978 | B2 | 12/2004 | Buchanan et al. |
| 6,887,184 | B2 * | 5/2005 | Buchanan et al. ............ 477/174 |
| 8,256,312 | B2 | 9/2012 | Hatori et al. |
| 2004/0166992 | A1 | 8/2004 | Buchanan et al. |
| 2005/0288149 | A1 * | 12/2005 | Kuhstrebe et al. .............. 477/97 |
| 2010/0184561 | A1 | 7/2010 | Schaarschmidt et al. |
| 2011/0306464 | A1 * | 12/2011 | Holland et al. ................. 477/77 |
| 2012/0312109 | A1 | 12/2012 | Kim et al. |
| 2012/0312110 | A1 | 12/2012 | Kim et al. |
| 2012/0312652 | A1 | 12/2012 | Kim et al. |

FOREIGN PATENT DOCUMENTS

| EP | 1 450 075 A2 | 8/2004 |
| FR | 2 837 256 A1 | 3/2003 |
| JP | 2-11646 U | 1/1990 |
| JP | 2002-122157 A | 4/2002 |
| JP | 2008-82526 A | 4/2008 |
| JP | 2011-2007 A | 1/2011 |
| KR | 10-0316912 B1 | 12/2001 |
| KR | 10-2006-0134423 A | 12/2006 |
| KR | 10-2008-0029137 A | 4/2008 |
| WO | WO 2004/028850 A1 | 4/2004 |

\* cited by examiner

*Primary Examiner* — Roger Pang
(74) *Attorney, Agent, or Firm* — Morgan, Lewis & Bockius LLP

(57) ABSTRACT

A method of controlling a DCT (double clutch transmission) of a vehicle to conduct a series of downshifting operations from a preceding gear to a subsequent gear via a current gear in response to deceleration of the vehicle may include slip-controlling, continuously, a clutch which has been in an engaged state in the preceding gear, at least until a shift gear of the subsequent gear is engaged, wherein the slip-controlling includes maintaining the engaged state of the clutch with the current gear.

6 Claims, 3 Drawing Sheets

METHOD OF CONTROLLING DOUBLE CLUTCH TRANSMISSION OF VEHICLE

CROSS-REFERENCE TO RELATED APPLICATIONS

The present application claims priority to Korean Patent Application No. 10-2011-0055635 filed on Jun. 9, 2011, the entire contents of which is incorporated herein for purposes by this reference.

BACKGROUND OF THE INVENTION

1. Field of the Invention

The present invention relates generally to a method of controlling a double clutch transmission (DCT) of a vehicle and, more particularly, to a technique for preventing shift shock from occurring when shifting gears in response to deceleration of a vehicle provided with a DCT.

2. Description of Related Art

A downshifting process of a DCT when a vehicle provided with the DCT decelerates, for example, to stop, will be described below with reference to FIG. 1.

FIG. 1 illustrates a process of downshifting from the preceding gear N+1 to a subsequent gear N−1 via a current gear N when decelerating a DCT vehicle including a first input shaft and a second input shaft which are respectively coupled to a first clutch and a second clutch. When in the current gear N, the first clutch which has been in an engaged state in the preceding gear N+1 is released, and the second clutch engages to allow transmission of torque. Thereafter, contrary to this, when in the subsequent gear N−1, the first clutch enters the engaged state to allow transmission of torque, and the second clutch is released.

To shift from the current gear N to the subsequent gear N−1, synchronization of a synchronizer takes place to engage a shift gear of the subsequent gear N−1, following engaging the first clutch and releasing the second clutch so that power is transmitted through the shift gear of the subsequent gear N−1.

However, during the synchronization conducted to engage a shift gear of the subsequent gear N−1, shift shock may occur. In detail, if the rpm of the first input shaft is less than that of the output shaft when engaging the shift gear of the subsequent gear N−1, backlash of elements pertaining to transmission of power between the input shaft and the output shaft, which has been arranged in one direction when synchronization takes place to engage the shift gear of the subsequent gear N−1, is rearranged in the reverse direction when the synchronization is completed or the transmission of power from the input shaft to the output shaft begins. At this time, shift shock and noise occur.

In other words, during synchronization for engagement of the shift gear of the subsequent gear N−1, if the rpm of the first input shaft coupled to the first clutch is less than that of the output shaft, when synchronization begins to take place as the sleeve moves, torque is applied from the output shaft in a direction in which the first input shaft is operated. At this time, backlash of elements, for example, a hub, the sleeve, shift gears, etc., which pertain to a power transmission path from the output shaft to the first input shaft is arranged in one direction.

Subsequently, when the sleeve further moves, the sleeve passes over a synchronizer ring and a key. Thereby, the compression force with which the sleeve pushed the synchronizer ring is removed, resulting in a momentary breakdown of the synchronization.

During breakdown of the synchronization, if there is no frictional resistance induced as a result of the rotation of the first input shaft, the first input shaft may rotate freely and thus maintains the rpm when in the synchronized state. The rpm of the output shaft reduces because the vehicle is decelerating. As a result, just before the sleeve which has further moved engages with the clutch gear, the rpm of the first input shaft exceeds that of the output shaft.

In this state, if the sleeve just moves and engages with the clutch gear, torque is applied to the elements in the direction in which the first input shaft that is faster than the output shaft rotates the output shaft. Thus, the backlash of the elements that have been arranged in one direction when the synchronization begins are rearranged in the reverse direction. Because of such a phenomenon, the corresponding elements between the first input shaft and the output shaft that have been rotating at high speeds collide with each other, thus causing shock and noise.

Such shift shock and noise which are induced during the above-mentioned process of the conventional technique deteriorate the quietness of the vehicle, causes a user discomfort, and reduce the marketability of the vehicle.

For reference, the circle portion A of FIG. 1 means shock and noise which occur from the first input shaft when shifting from the current gear N to the subsequent gear N−1, and the circle portion B indicates the shock and noise which are caused by the second input shaft when shifting from the subsequent gear N−1 to a lower subsequent gear.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of controlling a DCT of a vehicle in such a way that, when shifting gears from the current gear to a lower gear in response to deceleration of the vehicle, shift shock and noise are prevented from being induced by the backlash occurring between elements between an input shaft and an output shaft, thus enhancing the gear shift quality, thereby improving the quietness and riding comfort of the vehicle, and enhancing the marketability of the vehicle.

A method of controlling a DCT (double clutch transmission) of a vehicle to conduct a series of downshifting operations from a preceding gear to a subsequent gear via a current gear in response to deceleration of the vehicle may include slip-controlling, continuously, a clutch which may have been in an engaged state in the preceding gear, at least until a shift gear of the subsequent gear may be engaged.

The slip-controlling may include maintaining the engaged state of the clutch with the current gear.

The slip-controlling may include slip-controlling the clutch to control an amount of torque transmitted by the clutch in response to a deceleration rate of the vehicle.

The slip-controlling may include slip-controlling the clutch such that the amount of torque transmitted by the clutch may be increased as the deceleration rate of the vehicle increases.

The slip-controlling may include continuously slip-controlling the clutch, which may have been in the engaged state in the preceding gear, all throughout the current gear to the subsequent gear.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
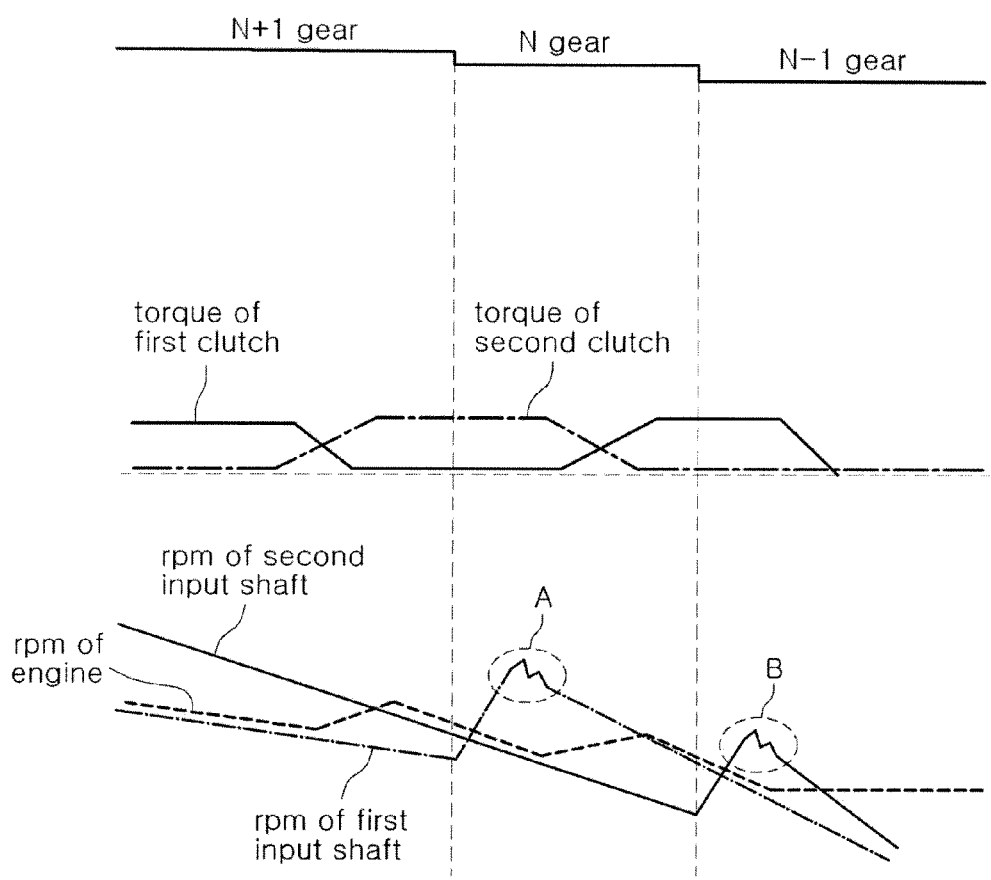
FIG. 1 is a graph illustrating a method of controlling a DCT of a vehicle, according to a conventional technique.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an embodiment of the present invention will be described in detail with reference to the attached drawings.

Figure 2:
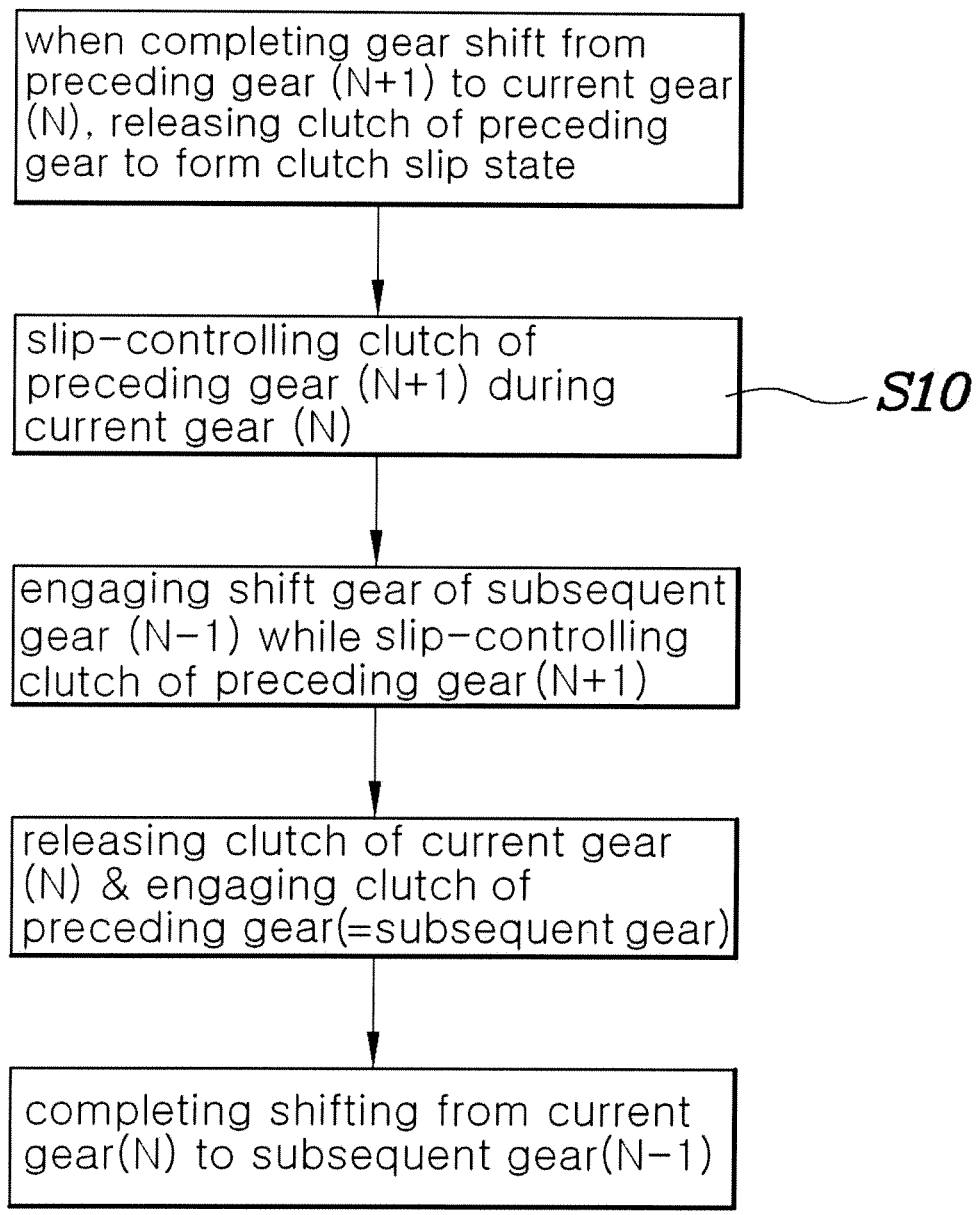
FIG. 2 is a flowchart of a method of controlling a DCT of a vehicle, according to an exemplary embodiment of the present invention.
Figure 3:
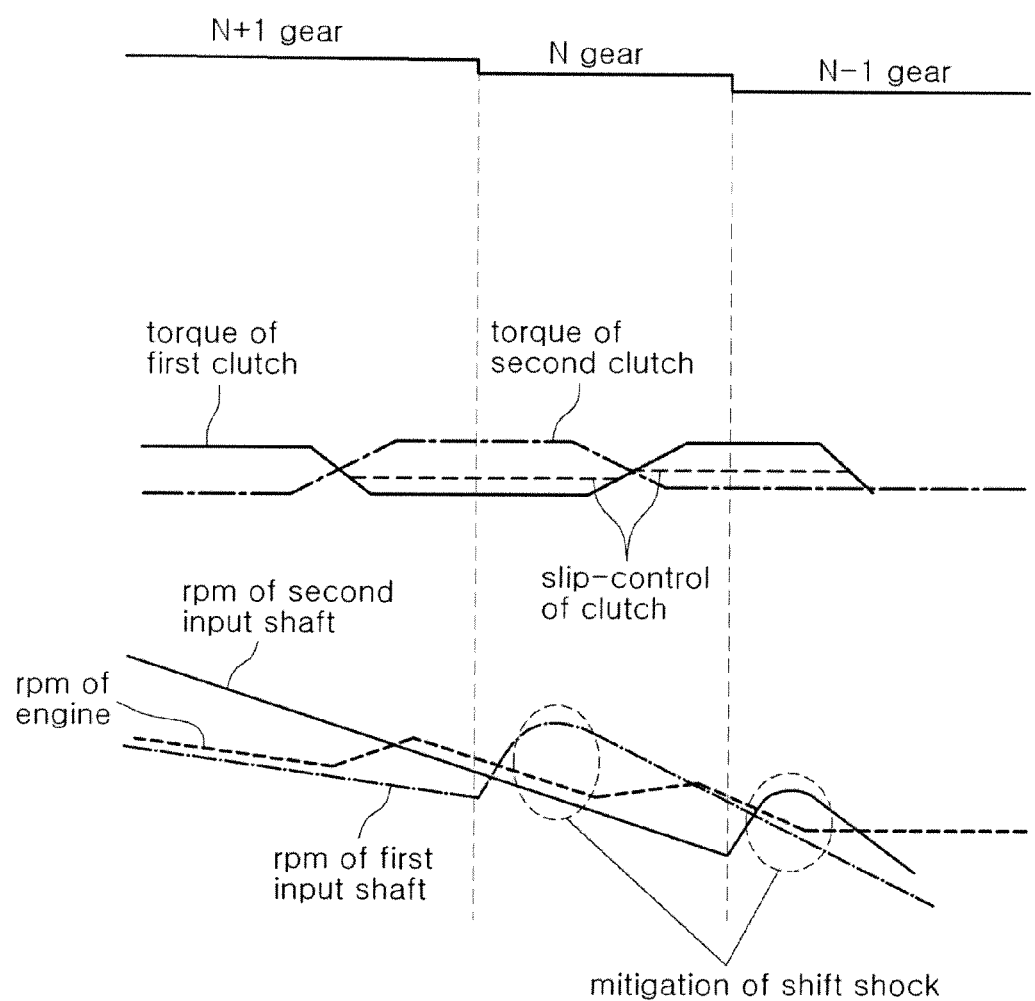
FIG. 3 is a graph illustrating the method of controlling the DCT according to an exemplary embodiment of the present invention.

Referring to FIGS. 2 and 3, the present invention provides a method of controlling a DCT of a vehicle according to an exemplary embodiment of the present invention when a series of downshifting operations from a preceding gear N+1 to a subsequent gear N−1 via a current gear N is conducted in response to deceleration of the vehicle. The method of the present invention includes a slip control step S10 of continuously slip-controlling a clutch, which has been in an engaged state in the preceding gear N+1, at least until a shift gear of the subsequent gear N−1 is engaged.

In detail, when shifting to the subsequent gear N−1, the clutch (the first clutch) which has been in the engaged state in the preceding gear N+1 is slip-controlled, rather than being completely released in the current gear N. Thus, gears are shifted to the subsequent gear N−1 while an rpm of a corresponding input shaft coupled to the clutch is maintained higher than that of an output shaft by fine torque transmitted by the clutch. Therefore, the present invention can prevent shift shock and noise which have occurred due to the conversion of backlash arrangement in the reverse direction in the conventional technique.

At the slip control step S10, the amount of torque transmitted by the clutch is controlled by slip-controlling the clutch in response to deceleration of the vehicle. For example, as a deceleration rate of the vehicle increases, the amount of torque transmitted by the clutch is increased or reduced by slip-controlling the clutch so that variation of backlash arrangement is minimized and a damping effect is increased.

As shown in FIG. 3, at the slip control step S10, the clutch (the first clutch) which has been in the engaged state in the preceding gear N+1 is slip-controlled until after the shift gear of the subsequent gear N−1 is engaged. The slip control is conducted continuously throughout the current gear N to the subsequent gear N−1.

As such, when in the current gear N, if the clutch (the first clutch) which has been in the engaged state in the preceding gear N+1 and will enter the engaged state in the subsequent gear N−1 to transmit power is slip-controlled, the rpm of the input shaft (the first input shaft) coupled to the clutch is at least equal to or higher than the rpm of the output shaft which is decelerating. Thus, torque is applied in the direction in which the input shaft operates the output shaft while synchronization conducted to engage the shift gear of the subsequent gar N−1 takes place to shift to the subsequent gear N−1. Thereafter, even when a sleeve completely engages with the shift gear of the subsequent gear N−1 after passing through a synchronization breakdown section, the rpm of the input shaft is higher than that of the output which is decelerating, and torque is still applied in the direction in which the input shaft operates the output shaft. Hence, backlash arrangement of elements between the input shaft and the output shaft which pertain to the power transmission can stay in a stable state without direction conversion during the shifting operation, thus preventing shift shock or noise from occurring.

Of course, the above-described shifting operation is conducted in the same manner even when shifting from the subsequent gear N−1 to a lower subsequent gear.

As described above, in a method of controlling a DCT of a vehicle according to an exemplary embodiment of the present invention, when shifting gears from the current gear to a lower target gear in response to deceleration of the vehicle, shift shock and noise can be prevented from being induced by backlash occurring between elements between an input shaft and an output shaft. Therefore, the gear shift quality is enhanced, thus improving the quietness and riding comfort of the vehicle, and enhancing the marketability of the vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a DCT (double clutch transmission) of a vehicle to conduct a series of downshifting operations from a preceding gear to a subsequent gear via a current gear in response to deceleration of the vehicle, the method comprising:
   slip-controlling, continuously, a clutch which has been in an engaged state in the preceding gear, at least until a shift gear of the subsequent gear is engaged.

2. The method as set forth in claim 1, wherein the slip-controlling includes maintaining the engaged state of the clutch with the current gear.

3. The method as set forth in claim 1, wherein the slip-controlling includes slip-controlling the clutch to control an amount of torque transmitted by the clutch in response to a deceleration rate of the vehicle.

4. The method as set forth in claim 3, wherein the slip-controlling includes slip-controlling the clutch such that the amount of torque transmitted by the clutch is increased as the deceleration rate of the vehicle increases.

5. The method as set forth in claim 1, wherein the slip-controlling includes continuously slip-controlling the clutch, which has been in the engaged state in the preceding gear, all throughout the current gear to the subsequent gear.

6. A method of controlling a DCT (double clutch transmission) of a vehicle to conduct a series of downshifting operations from a preceding gear to a subsequent gear via a current gear in response to deceleration of the vehicle, the method comprising:

slip-controlling a clutch, which has been in the engaged state in the preceding gear, without being completely released with the current gear at least until the subsequent gear is engaged so that gears are shifted to the subsequent gear while an rpm of a corresponding input shaft coupled to the clutch is maintained equal to or higher than an rpm of an output shaft by fine torque transmitted by the clutch.

\* \* \* \* \*